(12) United States Patent
Nortio et al.

(10) Patent No.: US 12,435,287 B2
(45) Date of Patent: Oct. 7, 2025

(54) BLENDING OF RENEWABLE FUELS

(71) Applicant: Neste Oyj, Espoo (FI)

(72) Inventors: Jenni Nortio, Porvoo (FI); Kati Sandberg, Porvoo (FI)

(73) Assignee: Neste Oyj, Espoo (FI)

( * ) Notice: Subject to any disclaimer, the term of this patent is extended or adjusted under 35 U.S.C. 154(b) by 0 days.

(21) Appl. No.: 17/312,989

(22) PCT Filed: Dec. 12, 2019

(86) PCT No.: PCT/FI2019/050889
§ 371 (c)(1),
(2) Date: Jun. 11, 2021

(87) PCT Pub. No.: WO2020/120843
PCT Pub. Date: Jun. 18, 2020

(65) Prior Publication Data
US 2022/0064557 A1    Mar. 3, 2022

(30) Foreign Application Priority Data
Dec. 13, 2018   (FI) ...................................... 20186074

(51) Int. Cl.
*C10L 10/04*    (2006.01)
*C10L 1/08*     (2006.01)
*C10L 10/14*    (2006.01)

(52) U.S. Cl.
CPC .................. *C10L 1/08* (2013.01); *C10L 10/14* (2013.01); *C10L 2200/043* (2013.01); *C10L 2200/0484* (2013.01); *C10L 2270/04* (2013.01); *C10L 2290/24* (2013.01)

(58) Field of Classification Search
CPC ............... C10L 10/14; C10L 2200/043; C10L 2200/0484; C10L 2270/04
See application file for complete search history.

(56) References Cited

U.S. PATENT DOCUMENTS

| | | | | |
|---|---|---|---|---|
| 8,975,461 | B2 * | 3/2015 | Peters ........................ | C10L 1/04 585/254 |
| 11,566,193 | B2 | 1/2023 | Sandberg et al. | |
| 2008/0244962 | A1 * | 10/2008 | Abhari ....................... | C10L 3/12 208/15 |
| 2009/0301930 | A1 | 12/2009 | Brandvold et al. | |
| 2013/0102817 | A1 * | 4/2013 | Dahlstrom ................ | C10L 1/04 585/13 |
| 2017/0183593 | A1 * | 6/2017 | Sandberg ................. | B01J 23/44 |
| 2017/0327757 | A1 | 11/2017 | Abhari et al. | |
| 2019/0002778 | A1 | 1/2019 | Sandberg et al. | |

FOREIGN PATENT DOCUMENTS

| | | |
|---|---|---|
| CN | 106929094 A | 7/2017 |
| CN | 108699459 A | 10/2018 |
| WO | 2018109278 A1 | 6/2018 |

OTHER PUBLICATIONS

Finnish Search Report dated Apr. 4, 2019, issued by the Finnish Patent and Registration Office in the corresponding Finnish Patent Application No. 20186074.
International Search Report (PCT/ISA/210) and Written Opinion (PCT/ISA/237) mailed on Feb. 10, 2020, by the European Patent Office as the International Searching Authority for International Application No. PCT/FI2019/050889.
Notification of Transmittal of The International Preliminary Report on Patentability (PCT Rule 71.1) (Form PCT/IPEA/416), International Preliminary Report on Patentability (PCT Article 36 and Rule 70) (Form PCT/IPEA/409) issued on Mar. 22, 2021, in the corresponding International Application No. PCT/FI2019/050889.
Chuck, C. J. et al., "The compatibility of potential bioderived fuels with Jet A-1 aviation kerosene", Applied Energy, vol. 118, pp. 83-91, Jan. 8, 2014.
Corporan, E. et al., Alternative Fuels Tests on a C-17 Aircraft: Emissions Characteristics. AFRL-RZ-WP-TR-2011-2004, 33 pages, Dec. 2010.
Corporan, E. et al., "Chemical, Thermal Stability, Seal Swell, and Emissions Studies of Alternative Jet Fuels", Energy Fuels, vol. 25, pp. 955-966, Mar. 2, 2011.
Edwards, J. T. et al., "U.S. Air Force Hydroprocessed Renewable Jet (HRJ) Fuel Research", AFRL-RQ-WP-TR-2013-0108, 92 pages, Jul. 2012.
Gutierrez-Antonio, C. et al., "A review on the production processes of renewable jet fuel", Renewable and Sustainable Energy Reviews, vol. 79, pp. 709-729, May 24, 2017.
Hong, T. D. et al., "A study on developing aviation biofuel for the Tropics: Production process—Experimental and theoretical evaluation of their blends with fossil kerosene", Chemical Engineering and Processing, vol. 74, pp. 124-130, Oct. 8, 2013.
Kinder, J. D. et al., "Evaluation of Bio-Derived Synthetic Paraffinic Kerosene (Bio-SPK)", 16 pages, Jun. 2009.

(Continued)

Primary Examiner — Ellen M McAvoy
Assistant Examiner — Ming Cheung Po
(74) Attorney, Agent, or Firm — Buchanan Ingersoll & Rooney PC

(57) ABSTRACT

An aviation fuel composition is disclosed, containing 50-95 vol-% of petroleum-derived jet fuel component, and 5-50 vol-% of renewable middle distillate component. The fuel composition has a viscosity of 12 mm2/s or below at −40° C., 10 mm2/s or below at −30° C., and 8 mm2/s or below at −20° C., as measured in accordance with an EN ISO 3104 (1996) standard. A method for producing the aviation fuel composition is also disclosed. The method containing mixing the petroleum derived jet fuel component and the renewable middle distillate component to obtain the aviation fuel composition, such that the petroleum-derived jet fuel component and the renewable middle distillate component are mixed together in an amount containing 5-50 vol-% of renewable middle distillate component and about 50-95 vol-% of petroleum-derived jet fuel component.

27 Claims, No Drawings

(56) References Cited

OTHER PUBLICATIONS

Llamas, A. et al., "Biokerosene from coconut and palm kernel oils: Production and properties of their blends with fossil kerosene", Fuel, vol. 102, pp. 483-490, Jul. 17, 2012.
Moses, C. et al., "Qualification of SASOL Semi-synthetic Jet A-1 as Commercial Jet Fuel", South West Research Institute Pblicatio—SWR, No. SwRl-8531, pp. 1-46, Nov. 1, 1997, XP008095497.
Pires, A. P. P. et al., "Chemical Composition and Fuel Properties of Alternative Jet Fuels", Bioresources, vol. 13, No. 2, pp. 2632-2657, May 2018.
Starck, L. et al., "Production of Hydroprocessed Esters and Fatty Acids (HEFA)—Optimisation of Process Yield", Oil & Gas Science and Technology—Rev. IFP Energies Nouvelles, vol. 71, No. 1, Jan. 22, 2016.
Striebich, R. et al., "Dependence of Fuel Properties During Blending of ISO-Paraffinic Kerosene and Petroleum-Derived Jet Fuel", URL:http://www.dtic.mil/dtic/tr/fulltext/u2/a504691.pdf, Nov. 1, 2008, XP055491760.
Wang, W.-C. et al., "Review of Biojet Fuel Conversion Technologies", National Renewable Energy Laboratory (NREL), Technical Report, 106 pages, Jul. 2016.
First Office Action issued on Aug. 15, 2022, by the Chinese Patent Office in corresponding Chinese Patent Application No. 201980077358.5, and an English Translation of the Office Action. (16 pages).
Office Action (Notification of the Second Office Action) issued on Mar. 30, 2023, by the Chinese Patent Office in corresponding Chinese Patent Application No. 201980077358.5, and an English Translation of the Office Action. (13 pages).

* cited by examiner

BLENDING OF RENEWABLE FUELS

FIELD OF THE INVENTION

The invention relates to fuel blending, and more particularly to blending of renewable fuel components.

BACKGROUND

The following background description art may include insights, discoveries, understandings or disclosures, or associations together with disclosures not known to the relevant art prior to the present invention but provided by the present disclosure. Some such contributions disclosed herein may be specifically pointed out below, whereas other such contributions encompassed by the present disclosure the invention will be apparent from their context.

Jet fuel is a type of aviation fuel designed for use in aircraft powered by gas-turbine engines. The most commonly used aviation fuels Jet A and Jet A-1 are produced to a standardized international specification. Jet fuel is a mixture of different hydrocarbons. Their sizes, molecular weights or carbon numbers are resulting from the physical properties required by the product specification, e.g. flash point, freezing point, boiling range. Kerosene-type jet fuel (including Jet A and Jet A-1) has a carbon number distribution between about 8 and 16 carbon atoms per molecule.

Fossil fuels or petroleum-based fuels may be at least partly replaced by fuels from biological sources. The renewable aviation fuel demand is growing in the future due to global initiatives to decrease the emissions of GHG, $CO_2$, etc. One possible key solution is to increase the use of renewable fuels in aviation fuels. Fuels from biological sources may include renewable feedstocks such as fats and/or oils. Several types of fuels may be obtained from these triacylglycerol-containing feedstocks. One of them is biodiesel which is defined as mono-alkyl esters of vegetable oils or animal fats. Biodiesel is produced by transesterifying the oil or fat with an alcohol such as methanol under mild conditions in the presence of a base catalyst. Another type of product that may be obtained from lipid feedstocks, is a fuel having a composition that simulates the composition of fossil diesel fuel, namely renewable middle distillate which is produced from the fat or oil by a hydrodeoxygenation reaction at an elevated temperature and pressure in the presence of a catalyst.

Aviation fuel is required to meet certain cold properties, including viscosity that is low enough in low temperatures to guarantee low temperature operability. Fuel viscosity depends on the temperature, the higher is the temperature the lower is the viscosity. Combining the excellent cold properties of a fuel with solutions combatting climate change, such as using renewable raw materials partly or totally for fuel manufacture, is highly desired for e.g. lowering traffic emissions, improving local air quality, and enhancing engine performance.

SUMMARY

According to an aspect, there is provided the subject matter of the independent claims. Embodiments are defined in the dependent claims.

One or more examples of implementations are set forth in more detail in the detailed description below. Other features will be apparent from the description and from the claims.

A fuel blend with enhanced cold properties is provided. The obtained fuel blends comprise components originating from renewable raw materials which may include waste and/or residue material only. The fuel blends obtained have lower viscosity than expected based on the calculated method in low temperatures enabling reliable low temperature operability.

DETAILED DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising", "containing" and "including" should be understood as not limiting the described embodiments to consist of only those features that have been mentioned and such embodiments may contain also features/structures that have not been specifically mentioned.

The viscosity requirement in the JET-A1 aviation fuel specification is a maximum of 8 $mm^2/s$ at a temperature of −20° C. Many engine and auxiliary power unit (APU) manufacturers specify a maximum viscosity of 12 $mm^2/s$ to ensure satisfactory low temperature starting (at a temperature of such as about −40° C.).

In an aspect, the present invention provides an aviation fuel composition comprising an aviation fuel composition comprising
  a) 50-95 vol-% of petroleum-derived jet fuel component, and
  b) 5-50 vol-% of renewable middle distillate fuel component,
  wherein the fuel composition has a viscosity of 12 $mm^2/s$ or below at −40° C., 10 $mm^2/s$ or below at −30° C., and 8 $mm^2/s$ or below at −20° C., as measured in accordance with an EN ISO 3104 (1996) standard.

In an embodiment, the measured viscosity of the fuel composition at −30° C. to −40° C. is lower than calculated viscosity of the fuel composition calculated based on the viscosities of the individual components thereof, the components being the petroleum-derived jet fuel component and renewable middle distillate component, wherein the viscosities are measured in accordance with the EN ISO 3104 (1996) standard.

In the composition of the invention, any kind of component can be used as petroleum-derived jet fuel component as long as the component meets the requirements specified in various aviation fuel standards. In an embodiment, petroleum-derived jet fuel component is selected from petroleum-based aviation range fuel. In another embodiment, petroleum-derived jet fuel component complies with at least one of aviation fuel standards selected from ASTM D1655, and DEFSTAN 91-91. In an embodiment, petroleum-derived jet fuel component is conventional JET A or JET A-1 fuel. The conventional JET A-1 fuel typically contains aromatic compounds in the range of 8.4 vol-% to 26.5 vol-%, paraffins in the range of 40 vol-% to 60 vol-%, and naphthenes 18 vol-% to 40 vol-%. The distillation range of JET A-1 fuel is typically from about 139° C. to about 300° C. (ASTM D86). Flash point of JET A-1 fuel is at least 38° C. (IP170).

Fuel components boil over a temperature range as opposed to having a single point for a pure compound. The boiling range or a distillation range covers a temperature interval from the initial boiling point defined as the temperature at which the first drop of distillation product is obtained, to a final boiling point when the highest-boiling compounds evaporate.

In an embodiment, renewable middle distillate component has distillation range from 130° C. to 320° C. Distillation range from 130° C. to 320° C. means that the component has a distillation range where the initial boiling point is at least 130° C. and the final boiling point is at most 320° C. In another embodiment, renewable middle distillate component has distillation range from 130° C. to 290° C. which a typical distillation range for an aviation fuel range component. In yet another embodiment, renewable middle distillate component has distillation range from 170° C. to 320° C. which is a typical distillation range for a diesel fuel range component.

Here, the term renewable source is meant to include feedstocks other than those obtained from petroleum crude oil. The renewable source that can be used in the present invention include, but is not limited to, bio oils and fats from plants and/or animals and/or fish and/or insects, and from processes utilizing microbes, such as algae, bacteria, yeasts and moulds, and suitable are also compounds derived from said fats and oils and mixtures thereof. The species yielding the bio oils or fats may be natural or genetically engineered. The bio oils and fats may be virgin oils and fats or recycled oils and fats.

Suitable bio oils containing fatty acids and/or fatty acid esters and/or fatty acid derivatives are wood-based and other plant-based and vegetable-based fats and oils such as rapeseed oil, colza oil, canola oil, tall oil, jatropha seed oil, sunflower oil, soybean oil, hempseed oil, olive oil, linseed oil, mustard oil, palm oil, peanut oil, castor oil, coconut oil, as well as fats contained in plants bred by means of gene manipulation, animal-based fats such as lard, tallow, train oil, and fats contained in milk, as well as recycled fats of the food industry and mixtures of the above, as well as fats and oils originating from processes utilizing microbes, such as algae, bacteria, yeasts and moulds.

Bio oil and fat suitable as fresh feed may comprise C12-C24 fatty acids, derivatives thereof such as anhydrides or esters of fatty acids as well as triglycerides and diglycerides of fatty acids or combinations of thereof. Fatty acids or fatty acid derivatives, such as esters may be produced via hydrolysis of bio oils or by their fractionalization or transesterification reactions of triglycerides or microbiological processes utilizing microbes.

In an embodiment, renewable middle distillate component is paraffinic middle distillate. In an embodiment, renewable middle distillate component is produced through Fischer-Tropsch process starting from gasification of biomass. This synthesis route is generally also called BTL, or biomass to liquid. It is well established in the literature that biomass, such as lignocellulosic material, can be gasified using oxygen or air in high temperature to yield a gas mixture of hydrogen and carbon monoxide (syngas). After purification of the gas, it can be used as feedstock for a Fischer-Tropsch synthesis route. In the Fischer-Tropsch synthesis paraffins are produced from syngas. The Fischer-Tropsch paraffins range from gaseous component to waxy paraffins and middle distillate boiling range paraffins can be obtained by distillation from the product. This middle distillate fraction can be used for production of Fischer-Tropsch derived diesel component.

In another embodiment, renewable middle distillate component is produced from renewable oil, such as vegetable oil, tall oil or animal fat or various waste streams containing fatty acids or triglycerides. The fatty acids and/or triglycerides of the renewable oil can be hydrogenated to yield normal paraffins (n-paraffins). It is well established in the literature that various hydrotreatment technologies, such as hydrodeoxygenation using NiMo, CoMo or NiW catalysts, can be used in order to remove the oxygen from fatty acid and acquire n-paraffins. N-paraffins acquired from renewable oils typically boil in the middle distillate range, but in certain case a distillation may be required to achieve a diesel fuel component.

Paraffinic component whether produced from biomass through Fischer-Tropsch synthesis or by hydrogenation of renewable oil is an excellent diesel fuel component. However, the formed n-paraffins have poor cold flow properties and typically need to be isomerized to improve their cold flow properties. In an embodiment of the invention, the paraffinic middle distillate is an isomerized paraffinic middle distillate. Isomerization of n-paraffins is well established in the literature and can be achieved e.g. by using Pt-SAPO-11 catalyst. An example of producing middle distillate fuel from renewable oil by hydrogenation followed by isomerization can be found in publication U.S. Pat. No. 8,278,492.

In an embodiment, the renewable middle distillate component comprises aromatic compounds in an amount of at most about 0.5 vol-%, iso-paraffins in an amount from at least 80 vol-% or preferably at least 90 vol-%, the rest being other paraffins such as n-paraffins and cyclic paraffins. In another embodiment, the renewable middle distillate component comprises more than about 70 wt-% of C15 to C18 paraffins, preferably more than about 85 wt-%, more preferably more than about 90 wt-%; less than about 20 wt-% of paraffins smaller than C15 paraffins, preferably less than about 10 wt-%, more preferably less than about 7 wt-%; and/or less than about 10 wt-% of paraffins larger than C18 paraffins, preferably less than about 5 wt-%, more preferably less than about 3 wt-%.

Distillation range of renewable middle distillate component is typically from 170° C. to 320° C. Flash point of renewable middle distillate component is more than 38° C. (EN ISO 2719).

In an embodiment the renewable middle distillate component has distillation range from 130° C. to 320° C. In an embodiment the renewable middle distillate component has distillation range from 130° C. to 290° C. In an embodiment the renewable middle distillate component has distillation range from 170° C. to 320° C.

In an embodiment the composition comprises renewable middle distillate component at least 30 vol-%, more preferably at least 35 vol-%, yet more preferably at least 40 vol-%. In an embodiment the composition comprises from 10 vol-% to 15 vol-% of renewable middle distillate component.

In an embodiment, the aviation fuel composition of the invention comprises up to about 50 vol-% of renewable middle distillate component. In another embodiment, the composition comprises up to about 30 vol-% of renewable middle distillate component. In a further embodiment, the composition comprises up to about 15 vol-% of renewable middle distillate component. In a further embodiment, the composition comprises up to about 10 vol-% of renewable middle distillate component. In a further embodiment, the composition comprises up to about 5 vol-% of renewable middle distillate component.

In an embodiment, the aviation fuel composition of the invention comprises at least about 95 vol-% of petroleum-derived jet fuel component. In another embodiment, the composition comprises at least about 90 vol-% of petroleum-derived jet fuel component. In a further embodiment, the composition comprises at least about 85 vol-% of petroleum-derived jet fuel component. In a further embodiment, the composition comprises at least about 70 vol-% of petroleum-derived jet fuel component. In a further embodiment, the composition comprises at least about 50 vol-% of petroleum-derived jet fuel component.

In an embodiment, the aviation fuel composition of the invention complies with at least one of aviation fuel standards selected from ASTM D1655, DEFSTAN 91-91, JET A and JET A-1.

In another aspect, the present invention provides a method for producing an aviation fuel composition of the invention, comprising mixing petroleum-derived jet fuel component and renewable middle distillate component. In an embodiment, petroleum-derived jet fuel component and renewable middle distillate component are mixed together in an amount comprising about 5-50 vol-% of renewable middle distillate component and about 50-95 vol-% of petroleum-derived jet fuel component.

In an embodiment, the renewable middle distillate component has distillation range from 130° C. to 320° C. In another preferred embodiment, the renewable middle distillate component has distillation range from 130° C. to 290° C. In an embodiment the obtained fuel composition comprises renewable middle distillate component up to 30 vol-%, more preferably up to 35 vol-%, yet more preferably up to 40 vol-%. In an embodiment, the renewable middle distillate component has distillation range from 170° C. to 320° C. In an embodiment, the obtained fuel composition comprises from 10 vol-% to 50 vol-% of renewable middle distillate fuel component.

According to an embodiment, an improved and surprising viscosity behavior is obtainable by an aviation fuel blend containing up to 50% of renewable paraffinic component. The viscosity of the fuel blend at a temperature from −30° C. to −40° C. is better (i.e. lower) than expected by the calculated method. Thus, enhanced cold viscosity properties in fuel blends containing conventional and renewable fuel components are achieved.

The benefits of the enhanced cold viscosity properties are related to the pumpability and flowing characteristics of the fuel. In aviation, the ambient temperature can be very low, so a fuel blend with improved cold viscosity properties is beneficial and desirable.

When blending two different middle distillate components together, the viscosity of the blend cannot be linearly calculated from the viscosities of the components and blending ratio.

Fuel viscosity may be calculated via viscosity indexes (Chevron viscosity blending function). Viscosity index VBi for a fuel component may be calculated by using formula (I):

$$VBI_i = [LN(Cs_i)]/[LN(1000*Cs_i)] \quad (I),$$

where $Cs_i$ = viscosity.

Viscosity index $VBI_B$ for a fuel blend may be calculated by means of viscosity indexes of individual components by using formula (II):

$$VBI_B = \Sigma V_i VBI_i \quad (II),$$

where $V_i$ is the volume ratio of the component.

The viscosity index of the fuel blend may then be transformed to fuel blend viscosity $Cs_B$ by using formula III:

$$Cs_B = EXP([(VBI_B)*LN(1000)]/[1-VBI_B]) \quad (III).$$

The formula (I) for the viscosity index was originally developed for middle distillate type fuel at 40° C.

Example 1

Three different renewable fuels were tested. REN-1 had distillation range 130-290° C. and REN-2 and REN-3 had distillation range 170-320° C. The renewable fuels were blended with fossil jet fuels (fossil JET-1, fossil JET-2 and fossil JET-3). Viscosities for the blends were calculated based on the formula as described above. The viscosities were also measured using method EN ISO 3104(1996). The results for the measured and calculated viscosities of the fuel blends are presented in Tables 1, 2, 3 and 4.

TABLE 1

Blends with REN-1 and fossil JET-1.

| REN-1 (vol-%) | Fossil JET-1 (vol-%) | Calculated viscosity (mm$^2$/s) | Measured viscosity at −40° C. (mm$^2$/s) | Difference (mm$^2$/s) |
|---|---|---|---|---|
| 5 | 95 | 5.173 | 5.141 | 0.032 |
| 10 | 90 | 5.553 | 5.495 | 0.059 |
| 15 | 85 | 5.968 | 5.883 | 0.085 |
| 30 | 70 | 7.465 | 7.213 | 0.252 |
| 50 | 50 | 10.249 | 9.870 | 0.379 |

TABLE 2

Blends with REN-2 and fossil JET-1.

| REN-2 (vol-%) | Fossil JET-1 (vol-%) | Calculated viscosity (mm$^2$/s) | Measured viscosity at −30° C. (mm$^2$/s) | Difference (mm$^2$/s) |
|---|---|---|---|---|
| 15 | 85 | 4.616 | 4.569 | 0.047 |
| 30 | 70 | 6.112 | 5.965 | 0.147 |
| 50 | 50 | 9.160 | 8.942 | 0.218 |

TABLE 3

Blends with REN-3 and fossil JET-2.

| REN-3 (vol-%) | Fossil JET-2 (vol-%) | Calculated viscosity (mm$^2$/s) | Measured viscosity at −30° C. (mm$^2$/s) | Difference (mm$^2$/s) |
|---|---|---|---|---|
| 10 | 90 | 4.357 | 4.277 | 0.080 |

TABLE 4

Blends with REN-3 and fossil JET-3.

| REN-3 (vol-%) | Fossil JET-3 (vol-%) | Calculated viscosity (mm$^2$/s) | Measured viscosity at −30° C. (mm$^2$/s) | Difference (mm$^2$/s) |
|---|---|---|---|---|
| 10 | 90 | 5.801 | 5.705 | 0.096 |

As can be seen from the results presented in Tables 1-4, the measured viscosities at −20 . . . −40° C. of the renewable middle distillate component (REN) blended with conventional fossil jet fuel were better than the calculated viscosities of said blends.

This behavior was stronger the higher the REN ratios are and the colder the temperature. Phenomena was seen with fuel blends containing 5 vol-%-50 vol-% of renewable middle distillate component having distillation range 130-290° C., as well as with fuel blends containing 10 vol-%-50 vol-% of renewable middle distillate component having distillation range 170-320° C.

Computationally it may be assumed that a certain viscosity is obtained by a blend of fossil and renewable fuel. Surprisingly, with the compositions according to the present invention, this viscosity has proved to be better than computationally estimated. This observation is reflected in the cold operability of the fuel blend, i.e. the fuel performs even better than expected by calculation at high altitude cold temperature. There are specification limits max 8 mm²/s at −20° C. and max 12 mm²/s at −40° C. which the blend has to meet. The calculations may be used to estimate the fuel proportions used in the blending, and according to the present invention, the renewable portion in the blend may be even increased within certain limits, as the fuel cold flow properties are better than expected in these lower temperatures. Thus, the phenomenon observed herein also allows variations in the optimization of the blending.

It will be obvious to a person skilled in the art that, as the technology advances, the inventive concept can be implemented in various ways. The invention and its embodiments are not limited to the examples described above but may vary within the scope of the claims.

The invention claimed is:

1. An aviation fuel blend having a measured viscosity of 12 mm²/s or below at −40° C., and 10 mm²/s or below at −30° C., measured in accordance with an EN ISO 3104 (1996) standard, which measured viscosity is at least 0.032 mm²/s lower than a calculated viscosity $Cs_B$ for the aviation fuel blend, the calculated viscosity $Cs_B$ being calculated for the aviation fuel blend based on viscosities of individual fuels thereof at a respective temperature by using a formula (III):

$$Cs_B = EXP([(VBI_B)*LN(1000)]/[1-VBI_B]) \qquad (III),$$

where $VBI_B = \Sigma V_i VBI_i$,
where $V_i$ is a volume ratio of an individual fuel, and $$VBI_i = [LN(Cs_i)]/[LN(1000*Cs_i)],$$

where VBi is a viscosity index for an individual fuel, and $Cs_i$ is a viscosity of an individual fuel;
the aviation fuel blend consisting of individual fuels of petroleum-derived jet fuel in an amount of up to 95 vol-% mixed with renewable paraffinic middle distillate fuel in an amount of 5-40 vol-%;
wherein the renewable paraffinic middle distillate fuel is from vegetable oil, animal fat, fish fat, palm oil, rapeseed oil, cooking oil, biogas, algae oil, and/or microbial oil, and/or
wherein the renewable paraffinic middle distillate fuel is from hydrogenated fatty acid materials and/or hydrogenated triglyceride materials;
wherein the petroleum-derived jet fuel complies with at least one aviation fuel standard selected from ASTM D1655, DEFSTAN 91-91, JET A, and JET A-1;
wherein the renewable paraffinic middle distillate fuel is produced via a Fischer-Tropsch process and isomerisation, and/or wherein the renewable paraffinic middle distillate fuel is produced via hydrodeoxygenation and isomerisation, and
wherein the renewable paraffinic middle distillate fuel contains aromatic compounds in an amount of at most 0.5 vol-% and iso-paraffins in an amount of at least 80 vol-%, the rest being other paraffins and the renewable paraffinic middle distillate fuel comprises at least 70 wt-% of C15 to C18 paraffins.

2. The aviation fuel blend as claimed in claim 1, wherein the viscosities of the individual fuels are measured in accordance with the EN ISO 3104 (1996) standard.

3. The aviation fuel blend according to claim 1, wherein the renewable paraffinic middle distillate fuel has a distillation range from 130° C. to 320° C.

4. The aviation fuel blend according to claim 3, wherein the renewable paraffinic middle distillate fuel has a distillation range from 130° C. to 290° C.

5. The aviation fuel blend as claimed in claim 4, wherein the aviation fuel blend contains 30 vol-% to 40 vol-% of renewable paraffinic middle distillate fuel.

6. The aviation fuel blend as claimed in claim 4, wherein the aviation fuel blend contains 5 vol-% to 30 vol-% of renewable paraffinic middle distillate fuel.

7. The aviation fuel blend according to claim 3, wherein the renewable paraffinic middle distillate fuel has distillation range from 170° C. to 320° C.

8. The aviation fuel blend as claimed in claim 7, wherein the aviation fuel blend contains from 10 vol-% to 15 vol-% of renewable paraffinic middle distillate fuel.

9. The aviation fuel blend as claimed in claim 7, wherein the aviation fuel blend contains from 10 vol-% to 40 vol-% of the renewable paraffinic middle distillate fuel.

10. The aviation fuel blend as claimed in claim 1, wherein the renewable paraffinic middle distillate fuel is an iso-paraffinic middle distillate fuel.

11. The aviation fuel blend as claimed in claim 1, wherein the renewable paraffinic middle distillate fuel contains:
more than 85 wt-% of C15 to C18 paraffins;
less than 20 wt-% of paraffins smaller than C15 paraffins; and
less than 10 wt-% of paraffins larger than C18 paraffins.

12. The aviation fuel blend as claimed in claim 1,
wherein the aviation fuel blend has a measured viscosity of 8 mm²/s or below at −20° C. measured in accordance with an EN ISO 3104 (1996) standard.

13. The aviation fuel blend as claimed in claim 1, wherein the renewable paraffinic middle distillate fuel contains:
more than 90 wt-% of C15 to C18 paraffins;
less than 7 wt-% of paraffins smaller than C15 paraffins; and
less than 3 wt-% of paraffins larger than C18 paraffins.

14. The aviation fuel blend as claimed in claim 1, wherein said other paraffins are n-paraffins and/or cyclic paraffins.

15. The aviation fuel blend as claimed in claim 1, wherein the renewable paraffinic middle distillate fuel is from biogas, algae oil and/or microbial oil, wherein the renewable paraffinic middle distillate fuel is from waste materials and/or residue materials.

16. A method for producing an aviation fuel blend having a measured viscosity of 12 mm²/s or below at −40° C., and 10 mm²/s or below at −30° C., measured in accordance with an EN ISO 3104 (1996) standard, which measured viscosity is at least 0.032 mm²/s lower than a calculated viscosity $Cs_B$ for the aviation fuel blend, the calculated viscosity $Cs_B$ being calculated for the aviation fuel blend based on viscosities of the individual fuels thereof at a respective temperature by using a formula (III):

$$Cs_B = EXP([(VBI_B)*LN(1000)]/[1-VBI_B]) \qquad (III),$$

where $VBI_B = \Sigma V_i VBI_i$,
where $V_i$ is a volume ratio of an individual fuel, and $$VBI_i = [LN(Cs_i)]/[LN(1000*Cs_i)],$$

where VBi is a viscosity index for an individual fuel, and $Cs_i$ is a viscosity of an individual fuel,
the method comprising:
mixing individual fuels of petroleum derived jet fuel, and renewable paraffinic middle distillate fuel, together in an amount consisting of 5-40 vol-% of renewable paraffinic middle distillate fuel and up to 95 vol-% of petroleum-derived jet fuel;

the method also comprising producing the renewable paraffinic middle distillate fuel from vegetable oil, animal fat, fish fat, palm oil, rapeseed oil, cooking oil, biogas, algae oil and/or microbial oil, and/or the method also comprising producing the renewable paraffinic middle distillate fuel from hydrogenated fatty acid materials and/or hydrogenated triglyceride materials;

wherein the petroleum-derived jet fuel complies with at least one aviation fuel standard selected from ASTM D1655, DEFSTAN 91-91, JET A, and JET A-1;

wherein the renewable paraffinic middle distillate fuel is produced via a Fischer-Tropsch process and isomerisation, and/or wherein the renewable paraffinic middle distillate fuel is produced via hydrodeoxygenation and isomerisation; and wherein the renewable paraffinic middle distillate fuel contains aromatic compounds in an amount of at most 0.5 vol-% and iso-paraffins in an amount of at least 80 vol-%, the rest being other paraffins and the renewable paraffinic middle distillate fuel comprises at least 70 wt-% of C15 to C18 paraffins.

17. The method as claimed in claim 16, wherein the renewable paraffinic middle distillate fuel has distillation range from 130° C. to 320° C.

18. The method as claimed in claim 17, wherein the renewable paraffinic middle distillate fuel has distillation range from 130° C. to 290° C.

19. The method as claimed in claim 18, wherein the aviation fuel blend contains 5 vol-% to 30 vol-% of renewable paraffinic middle distillate fuel.

20. The method as claimed in claim 18, wherein the aviation fuel blend contains 30 vol-% to 40 vol-% of renewable paraffinic middle distillate fuel.

21. The method as claimed in claim 16, wherein the renewable paraffinic middle distillate fuel has a distillation range from 170° C. to 320° C.

22. The method as claimed in claim 21, wherein the aviation fuel blend contains from 10 vol-% to 40 vol-% of the renewable paraffinic middle distillate fuel.

23. The method as claimed in claim 21, wherein the aviation fuel blend contains from 10 vol-% to 15 vol-% of renewable paraffinic middle distillate fuel.

24. The method as claimed in claim 16, wherein the viscosities of the individual fuels are measured in accordance with the EN ISO 3104 (1996) standard.

25. The method as claimed in claim 16, wherein the aviation fuel blend has a measured viscosity of 8 $mm^2/s$ or below at −20° C. measured in accordance with an EN ISO 3104 (1996) standard.

26. The method as claimed in claim 16, wherein said other paraffins are n-paraffins and/or cyclic paraffins.

27. The method as claimed in claim 16, wherein the method comprises producing the renewable paraffinic middle distillate fuel from the biogas, the algae oil and/or the microbial oil, the biogas, the algae oil and/or the microbial oil being waste materials and/or residue materials.

* * * * *